(12) United States Patent
Patel et al.

(10) Patent No.: US 7,647,316 B2
(45) Date of Patent: Jan. 12, 2010

(54) LINK OPTIMIZATION

(75) Inventors: Kavel Patel, Sunnyvale, CA (US);
Christopher Sanger, Glendale, CA (US); Josh Meyers, Hollywood, CA (US); Looja Tuladhar, Pasadena, CA (US)

(73) Assignee: YAHOO! Inc., Sunnyvale, CA (US)

( * ) Notice: Subject to any disclaimer, the term of this patent is extended or adjusted under 35 U.S.C. 154(b) by 265 days.

(21) Appl. No.: 11/682,233

(22) Filed: Mar. 5, 2007

(65) Prior Publication Data

US 2008/0222130 A1  Sep. 11, 2008

(51) Int. Cl.
*G06F 17/30* (2006.01)
(52) U.S. Cl. ............ 707/5; 707/3; 707/4; 709/218
(58) Field of Classification Search .......... 707/3–5; 709/217, 218
See application file for complete search history.

(56) References Cited

U.S. PATENT DOCUMENTS

| 7,043,535 | B2* | 5/2006 | Chi et al. ............... 709/218 |
| 2002/0052925 | A1* | 5/2002 | Kim et al. ............... 709/217 |
| 2005/0086219 | A1* | 4/2005 | Martin ..................... 707/3 |
| 2006/0015401 | A1 | 1/2006 | Chu et al. |
| 2007/0214132 | A1* | 9/2007 | Grubb et al. ............. 707/5 |
| 2008/0059607 | A1* | 3/2008 | Schneider ............... 709/218 |

* cited by examiner

*Primary Examiner*—Mohammad Ali
*Assistant Examiner*—Huawen Peng
(74) *Attorney, Agent, or Firm*—Beyer Law Group LLP (57) ABSTRACT

In an embodiment of the present invention, keywords may be dynamically optimized. This may include techniques for reducing the number of keywords assigned to a particular web page (and selecting which keywords to eliminate). This may also include techniques for reordering keywords, introducing new keywords, and/or changing the attributes of keywords (e.g., size, font, color, spacing, etc.) assigned to a particular web page. Any of these techniques may be dynamically implemented by basing the optimization on one or more metrics and data collected from user interactions with the webpage.

14 Claims, 8 Drawing Sheets

LINK OPTIMIZATION

BACKGROUND OF THE INVENTION

1. Field of the Invention

The present invention relates to the field of Internet advertising. More specifically, the present invention relates to the optimization of links displayed on a web page.

2. Description of the Related Art

A domain name is the top level of an Internet web site's Uniform Resource Locator (URL). For example, the URL "www.yahoo.com/sports/mlb.html" has the domain name "yahoo.com." Many companies prefer to have domain names that are easy to remember and/or are related to the goods and/or services that they provide. This is in part due to the fact that some users engage in direct navigation of web sites, wherein they type in generic names for the item, product, or service they are looking for prepended to a top level domain extension (e.g., ".com") in hopes of finding relevant web pages, instead of going through a traditional search engine. For example, a user may try "digitalcameras.com" in the hopes of finding a digital camera before or in lieu of using a search engine to do so.

There are a large number of domain names that are owned by parties other than companies involved in the traditional sale of goods and services. For example, it is not uncommon for individuals or companies to purchase generic domain names, such as "miamirealestate.com" and simply "park" the domain name, waiting until someone approaches them to purchase the domain name.

One way for the individuals or companies controlling these generic domain names to add revenue is to engage in a program wherein advertising is placed on the web sites associated with these domain names, in the hopes of attracting users engaging in direct navigation. Oftentimes this involves a partnership with a search engine or directory. It is also beneficial to place advertiser sponsored keywords on the web page instead of or in addition to direct advertising, as users are more likely to click on keywords than plain advertising. The keywords may then link to subsequent web pages containing search results from the search engine (including paid listings), just as if the user had typed those keywords into the search engine.

Domain match technology may be used to automatically examine a particular domain name and extract relevant keywords related to it for placement on the web page. This may involve the segmenting of the domain name into constituent terms and using any of a variety of topologies to get back a set of related keywords.

SUMMARY OF THE INVENTION

In an embodiment of the present invention, keywords may be dynamically optimized. This may include techniques for reducing the number of keywords assigned to a particular web page (and selecting which keywords to eliminate). This may also include techniques for reordering keywords, introducing new keywords, and/or changing the attributes of keywords (e.g., size, font, color, spacing, etc.) assigned to a particular web page. Any of these techniques may be dynamically implemented by basing the optimization on one or more metrics and data collected from user interactions with the webpage.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In an embodiment of the present invention, keywords may be dynamically optimized. This may include techniques for reducing the number of keywords assigned to a particular web page (and selecting which keywords to eliminate). This may also include techniques for reordering keywords assigned to a particular web page. Either of these techniques may be dynamically implemented by basing the optimization on one or more metrics.

The reduction of keywords is valuable to prevent cannibalization of user clicks. Underperforming keywords linked on a web page have the effect of lessening the overall monetization of the web page via a number of factors. One of these factors is the frequency by which users who click on an underperforming keyword wind up not clicking on perhaps a more valuable or likely to be monetized keyword. This may be due to the user, for example, deciding only to click on one keyword before giving up. As such, it is important that the system ensure that the one keyword the user selects is a high performing one. Another factor is simply the fact that the more keywords appear on a web page, the more like advertising they appear to be, and thus the more likely it is that the user will simply ignore all the keywords. Therefore, reducing the overall number of keywords on a web page to ensure that only the most useful keywords appear can significantly increase the monetization of the web page.

The metrics utilized to dynamically optimize the keywords may be any metric related to the likelihood that a user will ultimately purchase a good or service based on the keyword. In one embodiment, the metric may be search through rate, which is the rate at which users click on the particular keyword. In another embodiment, the metric may be revenue per thousand impressions, which measures the click through rates of advertisements placed on the subsequent page(s) that correspond to the keyword ((revenue/page views)*1000). Such metrics may be measured based on recent past performance, such as a prior day's data, which itself may be collected and aggregated per webpage, per group of webpages, and/or per market. Keywords with higher click through rates and/or higher revenue per thousand impressions may be selected ahead of lower performing keywords when determining which keywords to keep on the page, or placed higher than lower performing keywords when re-ordering the keywords. By utilizing recent usage data, the keywords are dynamically optimized and the performance of keywords is constantly monitored and factored into the optimization process.

The metrics may also include user-specific metrics. For example, the keywords displayed on a particular web page may be keyed towards the particular keywords most likely to get a response from the user. A user profile for the user may be accessed in order to aid in this analysis. Certain presumptions may be made based upon this user profile. Additionally, metrics such as geographical location and time of day may be utilized as well.

Collectively, all of these metrics may be said to provide information regarding the "quality" (i.e., the monetization potential) of the keywords.

It should be noted that the present invention is not limited to the placement of keywords on web pages of particular domain names. In other words, domain matching technology need not be used. The present invention may be used in other arenas where keyword optimization is necessary, such as the placement of keyword advertising on content rich pages. As such, rather than using domain match technology to select a first pass group of keywords (which then may be optimized using the techniques described above), the first pass may be made by examining the content of the web page itself to extract keywords (e.g., page crawling).

Mobile devices such as cell phones, portable e-mail devices, and mobile computers are being increasingly used to access the Internet. Such mobile devices often have more limited screen space and navigational abilities than the traditional desktop or laptop computer. In an embodiment of the present invention, keyword optimization is applied to web pages frequented by these mobile devices to further ensure that monetization is maximized. Such an embodiment may be combined with an embodiment applied to "normal" computers. For example, the system may take steps to determine the type of device on which the user is operating. This may include checking various communication properties (e.g., cell phones operate on different networks and/or have different source addresses than traditional computers). This may also include checking a user profile. The system may then apply a first optimization scheme for users on a traditional computer and a second optimization scheme for mobile devices (with, for example, fewer displayed keywords than even the optimized version for traditional computers).

As an example, a typical domain matching technique may be used to extract 10 keywords for a particular domain name. By applying various optimization techniques described above, the "best" 7 keywords may be displayed for users viewing the corresponding web page on a traditional computer, whereas the "best" 4 keywords may be displayed for users viewing the corresponding web page on a mobile device.

In the mobile device embodiment, additional metrics may be utilized as well. For example, rather than using a user profile to determine geographical location, Global Positioning System (GPS) functionality built into the mobile device may be utilized for such purposes.

Figure 1:
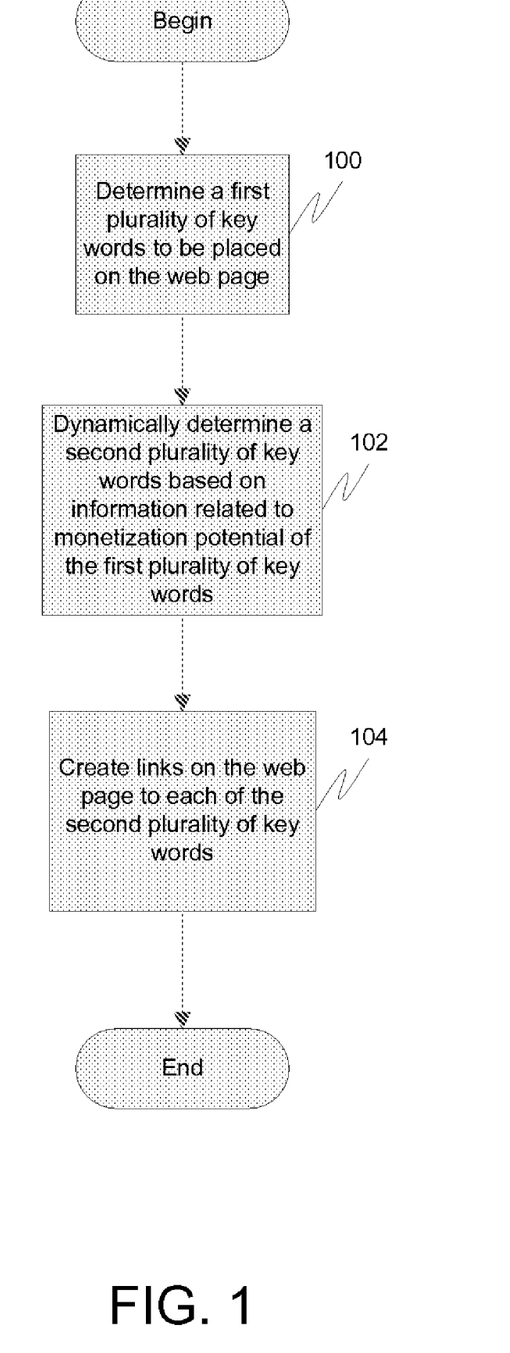
FIG. 1 is a flow diagram illustrating a method for placing keyword links on a web page in accordance with an embodiment of the present invention.

FIG. 1 is a flow diagram illustrating a method for placing keyword links on a web page in accordance with an embodiment of the present invention. At 100, a first plurality of keywords to be placed on the web page may be determined. This may include utilizing domain match technology to extract keywords from a domain name for the web page. It may also include examining the content of the web page to extract keywords. At 102, a second plurality of keywords may be dynamically determined based on information related to monetization potential of the first plurality of keywords. Monetization potential refers to the ability of the individual terms to ultimately result in revenue for the search engine or directory. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The dynamic aspect of the determination means that the system may evaluate the monetization potential of the key words at run time, or as close to at run time as possible, and that changes affecting the monetization potential of the key words may be quickly accounted for by the process. The second plurality of keywords may be a subset of the first plurality of keywords. Alternatively, the second plurality of keywords may include keywords not contained in the first plurality of keywords. At 104, links may be created on the web page to each of the second plurality of keywords.

Figure 2:
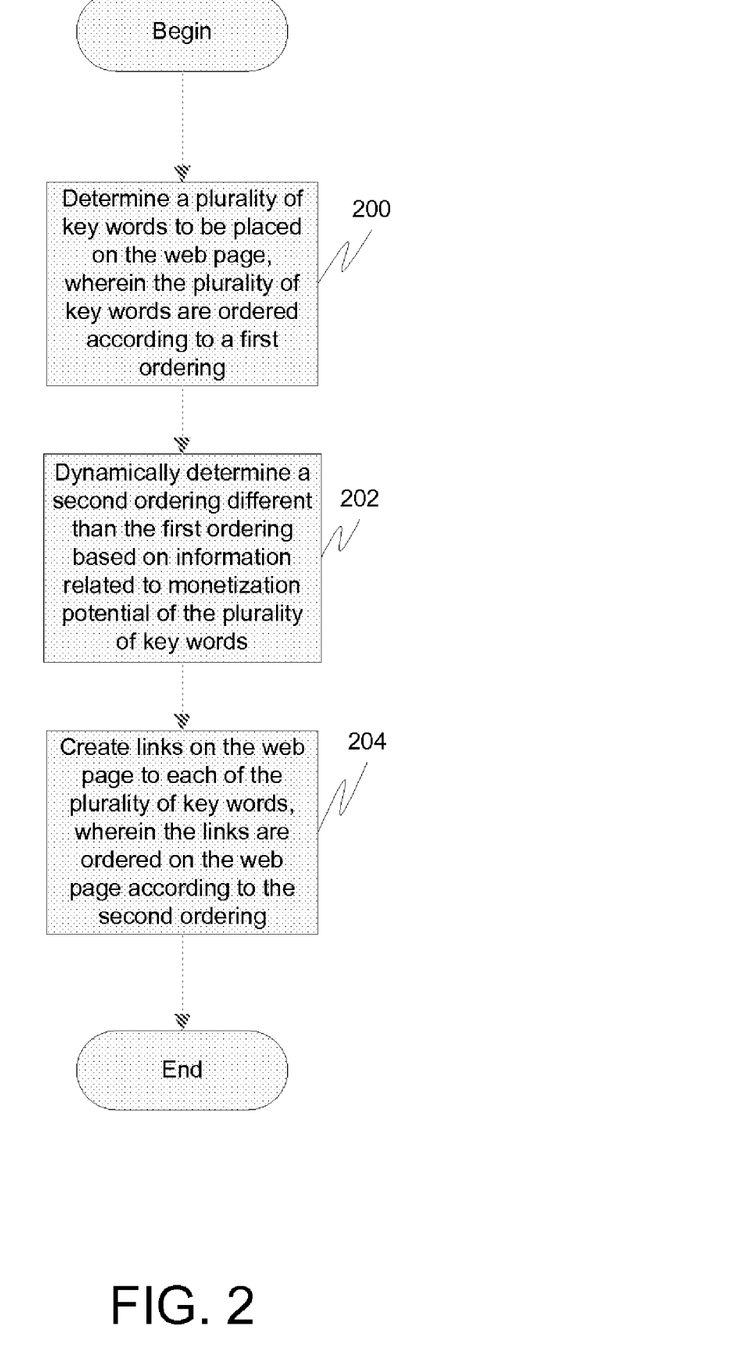
FIG. 2 is a flow diagram illustrating a method for placing keyword links on a web page in accordance with another embodiment of the present invention.

FIG. 2 is a flow diagram illustrating a method for placing keyword links on a web page in accordance with another embodiment of the present invention. At 200, a plurality of keywords to be placed on the web page may be determined, wherein the plurality of keywords are ordered according to a first ordering. This may include utilizing domain match technology to extract keywords from a domain name for the web page. It may also include examining the content of the web page to extract keywords. At 202, a second ordering different than the first ordering may be dynamically determined based on information related to monetization potential of the plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The second plurality of keywords may be a subset of the first plurality of keywords. At 204, links may be created on the web page to each of the plurality of keywords, wherein the links are ordered on the web page according to the second ordering. It should be noted that this embodiment may be combined in whole or in part with the embodiment described in FIG. 1 to both pare down an original set of keywords and re-order them.

Figure 3:
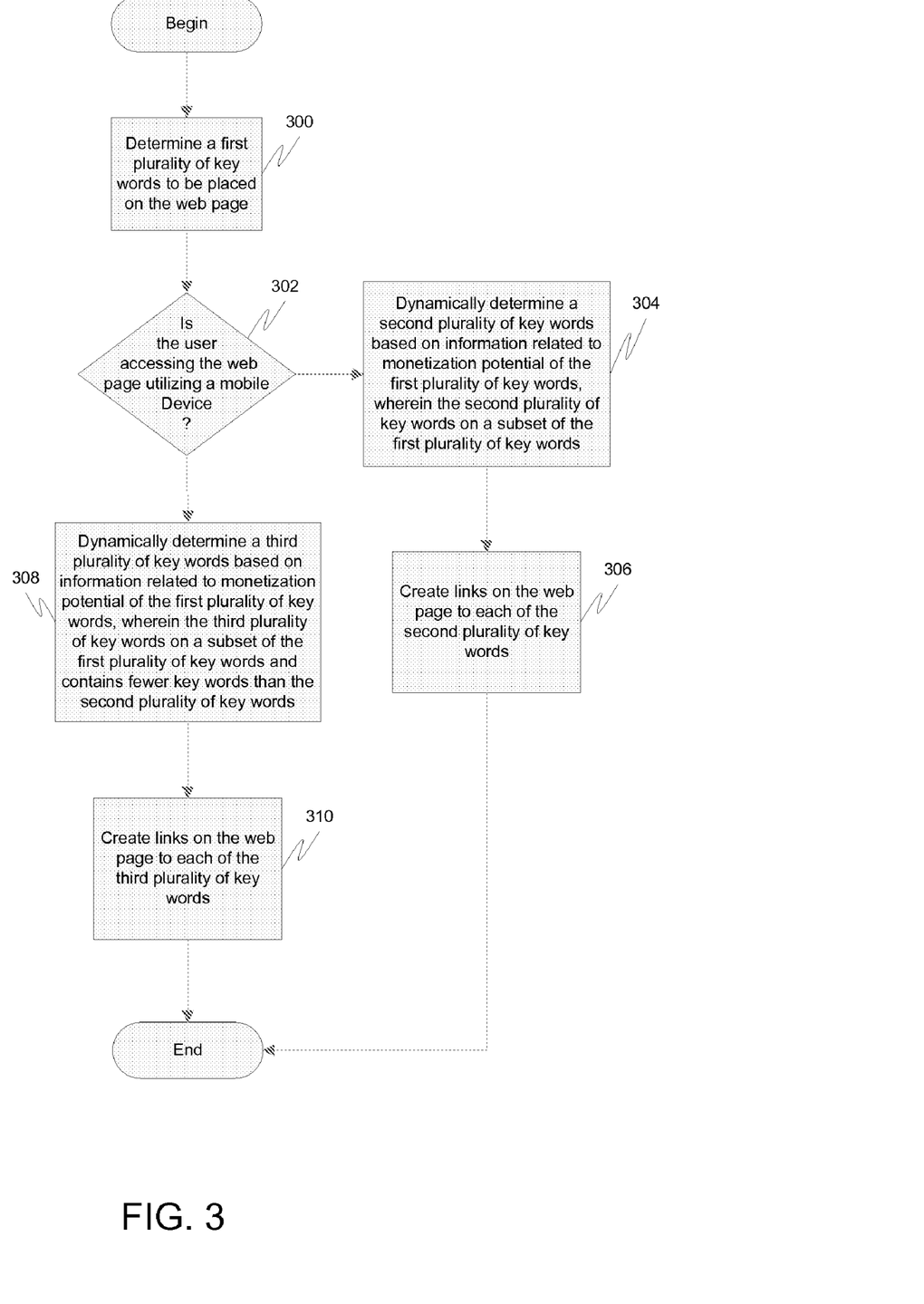
FIG. 3 is a flow diagram illustrating a method for placing keywords links on a web page in accordance with another embodiment of the present invention.

FIG. 3 is a flow diagram illustrating a method for placing keywords links on a web page in accordance with another embodiment of the present invention. At 300, a first plurality of keywords to be placed on the web page may be determined. This may include utilizing domain match technology to extract keywords from a domain name for the web page. It may also include examining the content of the web page to extract keywords. At 302, it may be determined if a user accessing the web page is utilizing a mobile device. If not, then at 304, a second plurality of keywords may be dynamically determined based on information related to monetization potential of the first plurality of keywords, wherein the second plurality of keywords is a subset of the first plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The second plurality of keywords may be a subset of the first plurality of keywords. Alternatively, the second plurality of keywords may include keywords not contained in the first plurality of keywords. At 306, links may be created on the web page to each of the second plurality of keywords. If at 302 it was determined that the user is utilizing a mobile device, then at 308, a third plurality of keywords may be dynamically determined based on information related to monetization potential of the first plurality of keywords, wherein the third plurality of keywords is a subset of the first plurality of keywords and contains fewer keywords than the second plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The second plurality of keywords may be subset of the first plurality of keywords. This may also include information regarding the mobile device utilized by the user, such as GPS or telephone number information. Then at 310, links may be created on the web page to each of the third plurality of keywords.

Figure 4:
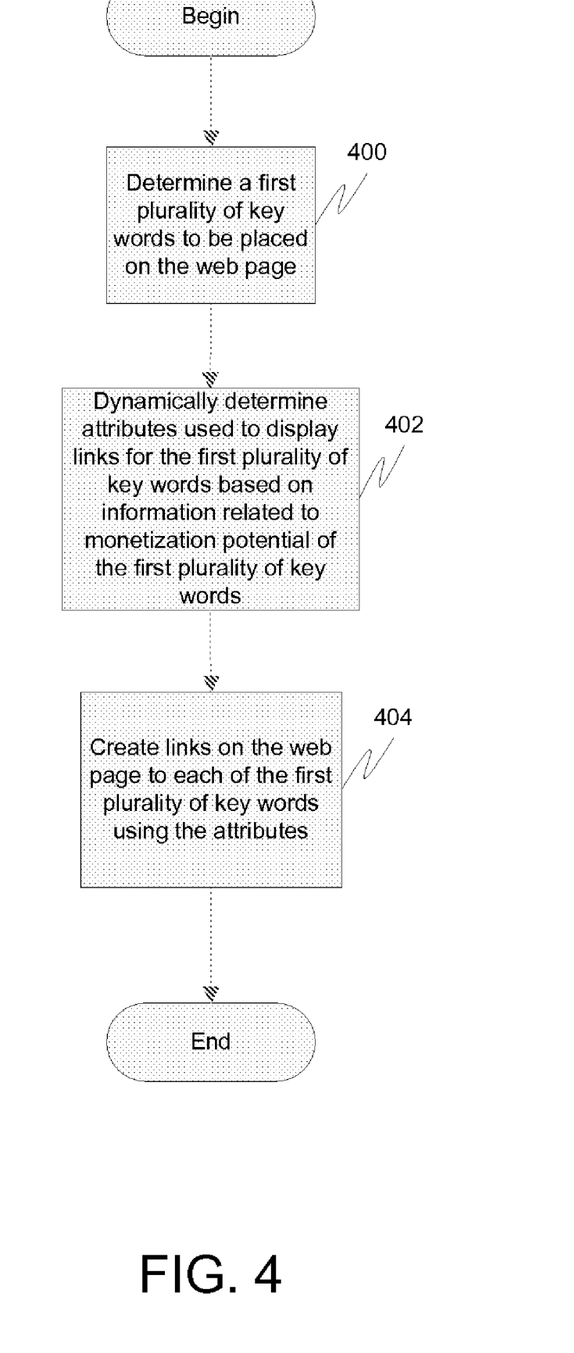
FIG. 4 is a flow diagram illustrating a method for placing keywords links on a web page in accordance with another embodiment of the present invention.

FIG. 4 is a flow diagram illustrating a method for placing keyword links on a web page in accordance with another embodiment of the present invention. At 400, a first plurality of keywords to be placed on the web page may be determined. This may include utilizing domain match technology to extract keywords from a domain name for the web page. It may also include examining the content of the web page to extract keywords. At 402, attributes to be used to display links to the first plurality of keywords may be dynamically determined based on information related to monetization potential of the first plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. These attributes may include various display settings for the links, such as, but not limited to, font, font color, font size, spacing, etc. At 404, links may be created on the web page to each of the first plurality of keywords using the attributes.

Figure 5:
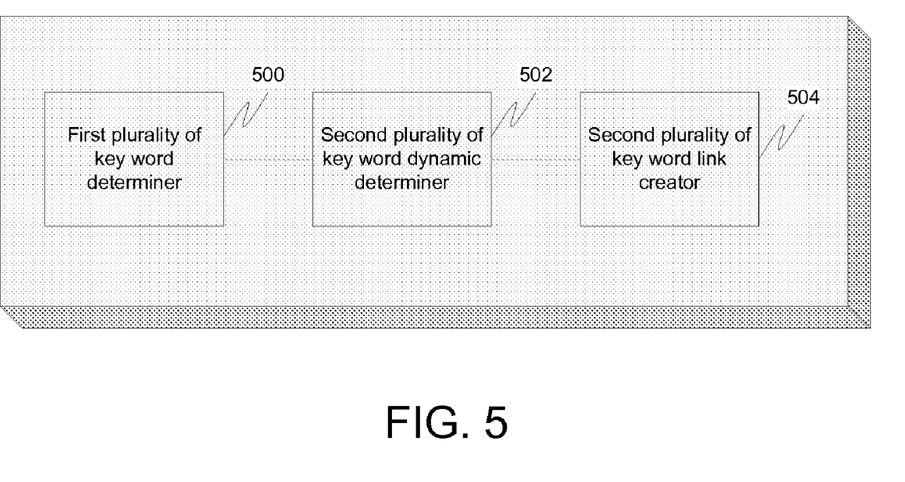
FIG. 5 is a block diagram illustrating an apparatus for placing keyword links on a web page in accordance with an embodiment of the present invention.

FIG. 5 is a block diagram illustrating an apparatus for placing keyword links on a web page in accordance with an embodiment of the present invention. A first plurality of keywords determiner 500 may determine a first plurality of keywords to be placed on the web page. This may include utilizing domain match technology to extract keywords from a domain name for the web page. It may also include examining the content of the web page to extract keywords. A second plurality of keywords dynamic determiner 502 coupled to the first plurality of keywords determiner 500 may dynamically determine a second plurality of keywords based on information related to monetization potential of the first plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The second plurality of keywords may be subset of the first plurality of keywords. Alternatively, the second plurality of keywords may include keywords not contained in the first plurality of keywords. A second plurality of keyword link creator 504 coupled to the second plurality of keyword dynamic determiner 502 may create links on the web page to each of the second plurality of keywords.

Figure 6:
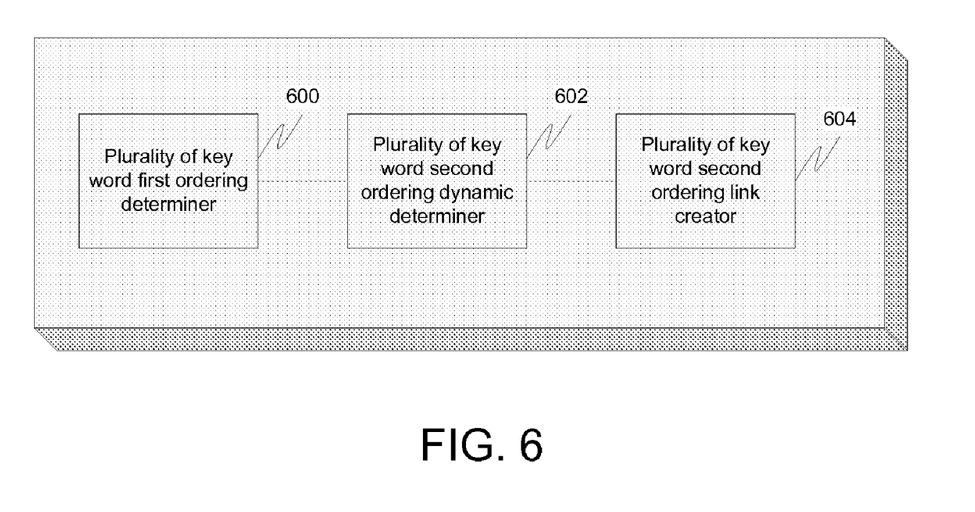
FIG. 6 is a block diagram illustrating an apparatus for placing keyword links on a web page in accordance with another embodiment of the present invention.

FIG. 6 is a block diagram illustrating an apparatus for placing keyword links on a web page in accordance with another embodiment of the present invention. A plurality of keyword first ordering determiner 600 may determine a plurality of keywords to be placed on the web page, wherein the plurality of keywords are ordered according to a first ordering. This may include utilizing domain match technology to extract keywords from a domain name for the web page. It may also include examining the content of the web page to extract keywords. A plurality of keyword second ordering dynamic determiner 602 coupled to the plurality of keyword first ordering determiner 600 may dynamically determine a second ordering different than the first ordering based on information related to monetization potential of the plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. The second plurality of keywords may be subset of the first plurality of keywords. A plurality of keyword second ordering link creator 604 coupled to the plurality of keyword second ordering dynamic determiner 602 may create links on the web page to each of the plurality of keywords, wherein the links are ordered on the web page according to the second ordering. If should be noted that this embodiment may be combined in whole or in part with the embodiment described in other figures to, for example, both pair down an original set of keywords and re-order them.

Figure 7:
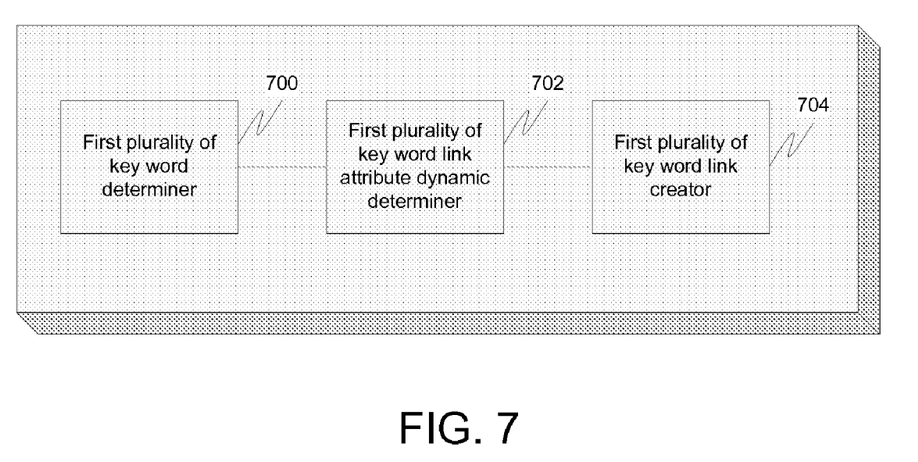
FIG. 7 is a block diagram illustrating an apparatus for placing keyword links on a web page in accordance with another embodiment of the present invention.
Figure 8:
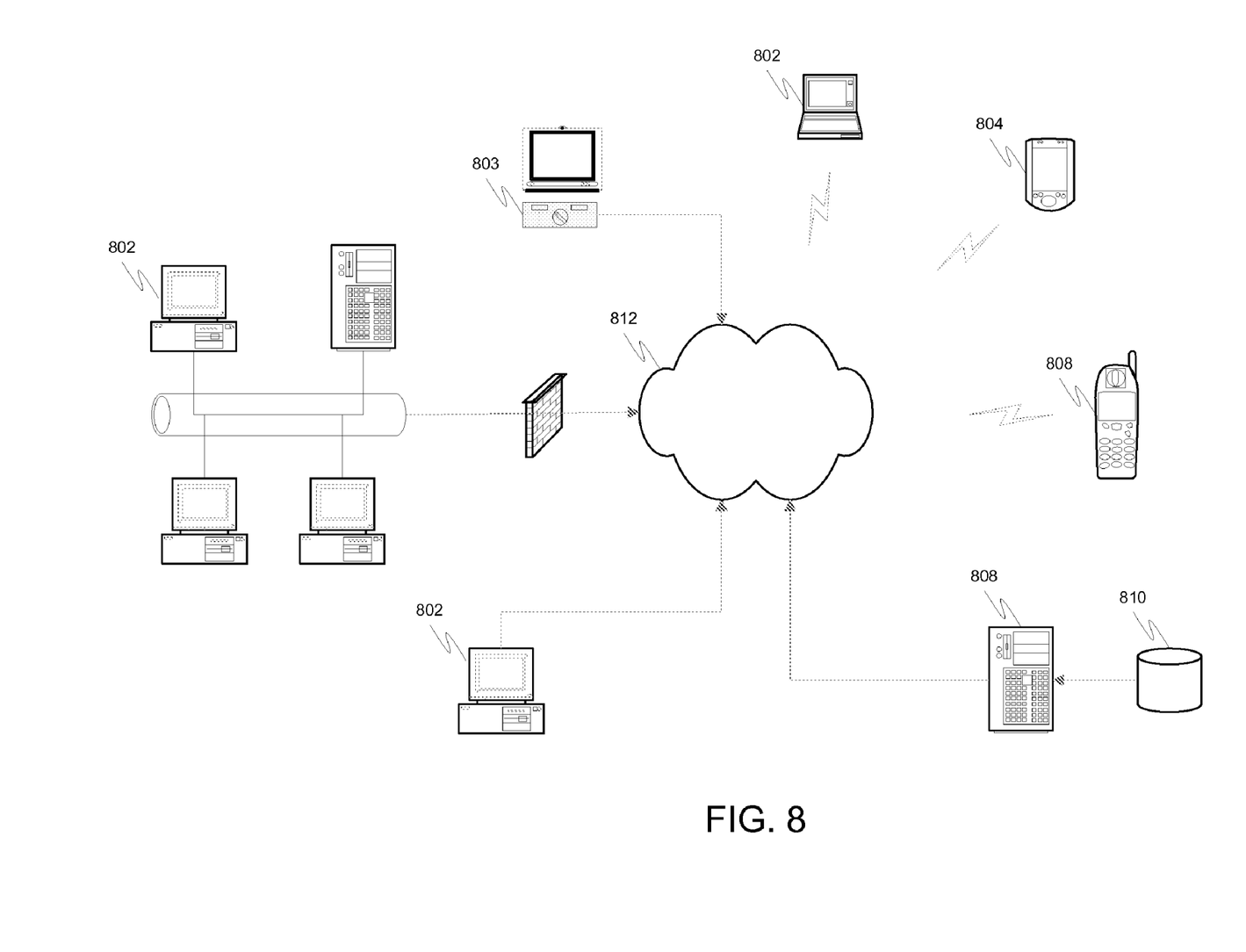
FIG. 8 is an exemplary network diagram illustrating some of the platforms that may be employed with various embodiments of the invention.

FIG. 7 is a block diagram illustrating an apparatus for placing keyword links on a web page in accordance with another embodiment of the present invention. A first plurality of keywords determiner 700 may determine a first plurality of keywords to be placed on the web page. This may include utilizing domain match technology to extract keywords from a domain name for the web page. It may also include examining the content of the web page to extract keywords. A first plurality of keyword link attribute dynamic determiner 702 coupled to the first plurality of keywords determiner 700 may dynamically determine attributes to be used to display the first plurality of keywords based on information related to monetization potential of the first plurality of keywords. This information may include, for example, the search through rate for each of the first plurality of keywords over a period of time, revenue per thousand impressions for each of the first plurality of keywords over a period of time, information regarding a user accessing the web page (e.g., geographic information about where the user is located, user search pattern information), etc. A first plurality of keyword link creator 704 coupled to the first plurality of keyword link attribute dynamic determiner 702 may create links on the web page to each of the first plurality of keywords using the attributes.

It should also be noted that the present invention may be implemented on any computing platform and in any network topology in which search is a useful functionality. For example and as illustrated in FIG. 6, implementations are contemplated in which the user applications are employed on personal computers 602, media computing platforms 603 (e.g., cable and satellite set top boxes with navigation and recording capabilities (e.g., Tivo)), handheld computing devices (e.g., PDAs) 604, cell phones 606, or any other type of portable communication platform. As discussed above, such applications may be resident on such devices, e.g., as part of a browser or other application, or be served up from a remote site, e.g., in a Web page, (represented by server 608 and data store 610). The invention may also be practiced in a wide variety of network environments (represented by network 612), e.g., TCP/IP-based networks, telecommunications networks, wireless networks, etc.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for placing keyword links on a web page, wherein a keyword link is a link that is embedded in a keyword on a web page such that when a user clicks on the keyword a linked web page is visited, the method being executed by at least one computing device, the method comprising:
   determining, by the at least one computing device, a first set of keywords to be placed on the web page by examining a domain name of the web page, dividing the domain name into constituent parts, and using a topology to derive keywords related to the constituent parts;
   dynamically determining, by the at least one computing device, based on information related to monetization potential of the first set of keywords, a second set of keywords, by comparing the monetization potential of each one of the first set of keywords with each other, wherein monetization potential is the likelihood that a user will ultimately purchase a good or service based on following a keyword link for a given keyword, wherein the second set of keywords contains fewer keywords than and is a proper subset of the first set of keywords;
   placing each of the second set of keywords on the web page, without placing keywords from the first set of keywords that are not in the second set of keywords, on the web page; and
   creating, by the at least one computing device, keyword links for each of the second set of keywords on the web page.

2. The method of claim 1, wherein the information related to monetization potential of the first set of keywords includes information selected from the group consisting of: search through rate for each of the first set of keywords over a period of time, revenue per thousand impressions for each of the first set of keywords over a period of time, and behavioral information regarding a user accessing the web page.

3. The method of claim 2, wherein the behavioral information regarding a user accessing the web page is geographic information about where the user is located.

4. The method of claim 3, wherein the behavioral information regarding a user accessing the web page is user search pattern information.

5. The method of claim 2, wherein the period of time is the previous day.

6. The method of claim 1, further comprising:
   if the user is utilizing a mobile device:
      dynamically determining, based on information related to monetization potential of the first set of keywords, a third set of keywords, wherein the third set of keywords is a subset of the first set of keywords and wherein the third set of keywords contains fewer keywords than the second set of keywords; and
      creating links to each of the third set of keywords on the web page.

7. The method of claim 6, wherein the information related to monetization potential of the first set of keywords includes information regarding a mobile device utilized by the user.

8. The method of claim 7, wherein the information regarding a mobile device utilized by the user includes information selected from the group consisting of: Global Positioning System (GPS) information regarding the mobile device, and a telephone number of the mobile device.

9. A computer-implemented method for placing keyword links on a web page, wherein a keyword link is a link that is embedded in a keyword on a web page such that when a user clicks on the keyword a linked web page is visited, the method being executed by at least one computing device, the method comprising:
   determining, by the at least one computing device, a first plurality of keywords to be placed on the web page, wherein the first plurality of keywords are ordered according to a first ordering, by examining a domain name of the web page, dividing the domain name into constituent parts, and using a topology to derive keywords related to the constituent parts;
   dynamically determining, by the at least one computing device, based on information related to monetization potential of the plurality of keywords, a second ordering different than the first ordering by comparing the monetization potential of each one of the plurality of keywords with each other, wherein monetization potential is the likelihood that a user will ultimately purchase a good or service based on following a keyword link for a given keyword;
   placing each of a second plurality of keywords on the web page, wherein the second plurality of keywords is a proper subset of the first plurality of keywords, without placing keywords from the first set of keywords that are not in the second set of keywords, on the web page, according to the second ordering; and
   creating, by the at least one computing device, keyword links to each of the plurality of keywords on the web page.

10. A method for placing keyword links on a web page, wherein a keyword link is a link that is embedded in a keyword on a web page such that when a user clicks on the keyword a linked web page is visited, the method comprising:

determining, by the at least one computing device, a first plurality of keywords to be placed on the web page by examining a domain name of the web page, dividing the domain name into constituent parts, and using a topology to derive keywords related to the constituent parts;

dynamically determining, by the at least one computing device, based on information related to monetization potential of the first plurality of keywords, wherein monetization potential is the likelihood that a user will ultimately purchase a good or service based on following a keyword link for a given keyword, attributes to be used to display links to the first plurality of keywords on the web page, by comparing the monetization potential of each of the first set of keywords with each other;

placing each of a second plurality of keywords on the web page, wherein the second plurality of keywords is a proper subset of the first plurality of keywords, without placing keywords from the first set of keywords that are not in the second set of keywords, on the web page, using the attributes; and creating, by the at least one computing device, keyword links to each of the second plurality of keywords on the web page.

11. The method of claim 10, wherein the attributes include an attribute selected from the group consisting of: font, font size, font color, and style.

12. One or more computing devices for placing keyword links on a web page, wherein a keyword link is a link that is embedded in a keyword on a web page such that when a user clicks on the keyword a linked web page is visited, the one or more computing device comprising:

a first plurality of keywords determiner configured to determine a first set of keywords to be placed on the web page by examining a domain name of the web page, dividing the domain name into constituent parts, and using a topology to derive keywords related to the constituent parts;

a second plurality of keywords dynamic determiner coupled to the first plurality of keywords determiner and configured to dynamically determine based on information related to monetization potential of a first plurality of keywords, a second plurality of keywords, by comparing the monetization potential of each one of the first plurality of keywords with each other, wherein monetization potential is the likelihood that a user will ultimately purchase a good or service based on following a keyword link for a given keyword, wherein the second plurality of keywords contains fewer keywords than and is a proper subset of the first plurality of keywords;

a second plurality of keywords placer coupled to the second plurality of keyword dynamic determiner and configured to place each of the second set of keywords on the web page, without placing keywords from the first set of keywords that are not in the second set of keywords, on the web page; and a second plurality of keyword link creator coupled to the second plurality of keywords placer.

13. One or more computing devices for placing keyword links on a web page, wherein a keyword link is a link that is embedded in a keyword on a web page such that when a user clicks on the keyword a linked web page is visited, the one or more computing devices comprising:

means for determining a first set of keywords to be placed on the web page by examining a domain name of the web page, dividing the domain name into constituent parts, and using a topology to derive keywords related to the constituent parts;

means for dynamically determining, based on information related to monetization potential of the first set of keywords, a second set of keywords, by comparing the monetization potential of each one of the first set of keywords with each other, wherein monetization potential is the likelihood that a user will ultimately purchase a good or service based on following a keyword link for a given keyword, wherein the second set of keywords contains fewer keywords than and is a proper subset of the first set of keywords;

placing each of the second set of keywords on the web page, without placing keywords from the first set of keywords that are not in the second set of keywords, on the web page; and means for creating links to each of the second plurality of keywords on the web page.

14. A program storage device readable by a machine, tangibly embodying a program of instructions executable by the machine to perform a method for placing keyword links on a web page, wherein a keyword link is a link that is embedded in a keyword on a web page such that when a user clicks on the keyword a linked web page is visited, the method comprising:

determining a first set of keywords to be placed on the web page by examining a domain name of the web page, dividing the domain name into constituent parts, and using a topology to derive keywords related to the constituent parts;

dynamically determining, based on information related to monetization potential of the first set of keywords, a second set of keywords, by comparing the monetization potential of each one of the first set of keywords with each other, wherein monetization potential is the likelihood that a user will ultimately purchase a good or service based on following a keyword link for a given keyword, wherein the second set of keywords contains fewer keywords than and is a proper subset of the first set of keywords;

placing each of the second set of keywords on the web page, without placing keywords from the first set of keywords that are not in the second set of keywords, on the web page; and creating keyword links for each of the second plurality of keywords on the web page.

* * * * *